United States Patent [19]

Maruyama et al.

[11] Patent Number: 5,061,753

[45] Date of Patent: Oct. 29, 1991

[54] RESIN COMPOSITION

[75] Inventors: Takashi Maruyama, Kobe; Tukio Mizuno, Miihama, both of Japan

[73] Assignee: Sumitomo Chemical Company, Limited, Osaka, Japan

[21] Appl. No.: 495,697

[22] Filed: Mar. 19, 1990

[30] Foreign Application Priority Data

| Mar. 22, 1989 | [JP] | Japan | 01-67475 |
| Mar. 22, 1989 | [JP] | Japan | 01-67476 |
| Mar. 22, 1989 | [JP] | Japan | 01-67477 |
| Mar. 22, 1989 | [JP] | Japan | 01-67478 |
| Mar. 22, 1989 | [JP] | Japan | 01-67479 |

[51] Int. Cl.$^5$ ............................................. CorL 61/04
[52] U.S. Cl. .................................... 525/68; 525/74; 525/77; 525/78; 525/80; 525/92; 525/148; 525/207; 525/208; 525/210; 525/220; 525/905
[58] Field of Search .......................... 525/68, 92, 905

[56] References Cited

U.S. PATENT DOCUMENTS

| 4,728,461 | 3/1988 | Fujii et al. | 525/95 |
| 4,840,982 | 6/1989 | Campbell et al. | 525/95 |

FOREIGN PATENT DOCUMENTS

| 0226851 | 11/1986 | European Pat. Off. . |
| 0292153 | 5/1988 | European Pat. Off. . |
| 0088293 | 2/1983 | European Pat. Off. . |
| 42-7069 | 5/1967 | Japan . |
| 53-71158 | 6/1978 | Japan . |
| 54-88960 | 7/1979 | Japan . |
| 58-103556 | 6/1983 | Japan . |
| 58-103557 | 6/1983 | Japan . |
| 59-100159 | 6/1984 | Japan . |
| 60-76547 | 5/1985 | Japan . |

*Primary Examiner*—Jacob Ziegler
*Attorney, Agent, or Firm*—Stevens, Davis, Miller & Mosher

[57] ABSTRACT

The present invention provides a resin composition comprising:
(a) a polyolefin resin in an amount of 20-95% by weight,
(b) a polyphenylene ether resin in an amount of 80-5% by weight,
(c) a partially hydrogenated alkenyl aromatic compound-isoprene block copolymer in an amount of 3-45 parts by weight based on totally 100 parts by weight of the components (a) and (b), and
(d) an ethylene-α-olefin copolymer elastomer modified by grafting thereon a graft monomer such as an unsaturated monocarboxylic acid or a derivative thereof, an unsaturated dicarboxylic acid or a derivative thereof, a styrene compound, or an unsaturated epoxy compound or an α-olefin-alkyl (meth)acrylate copolymer such as a copolymer of an α-olefin of 2-6 carbon atoms and an alkyl (meth)acrylate having an alkyl group of 1-8 carbon atoms in an amount of 3-45 parts by weight based on totally 100 parts by weight of the components (a) and (b).

29 Claims, No Drawings

RESIN COMPOSITION

BACKGROUND OF THE INVENTION

The present invention relates to a resin composition which shows especially excellent balance of mechanical properties including mainly rigidity and is superior in processability, oil resistance and chemical resistance.

More particularly, it relates to a resin composition for injection molding, extrusion molding or blow moding which comprises a polyolefin, especially, a crystalline polyolefin, a polyphenylene ether resin, a partially hydrogenated alkenyl aromatic compound-isoprene block copolymer, and a specific ethylene-α-olefin copolymer elastomer or an α-olefin-alkyl (meth)acrylate copolymer and which is excellent in balance of mechanical properties of mainly rigidity and heat resistance superior in processability, organic solvent resistance and chemical resistance.

Polyolefins are superior in processability, toughness, water resistance, organic solvent resistance, chemical resistance, etc., low in specific gravity and inexpensive and hence have been widely used for production of various shaped articles and sheets. However, they suffer from the problem in heat resistance, which has hindered development of new uses thereof.

On the other hand, polyphenylene ether resins have excellent heat resistance, but has difficulties in processability and solvent resistance, which impose limitation on the scope of application. For improvement of processability and impact strength, blend of polyphenylene ether resin with a styrene resin is utilized, but this has defect in solvent resistance and is limited in scope of application. For example, the blend is not suitable in the field which requires resistance to oily solvents such as gasoline.

In an attempt to utilize the respective merits of these polyolefin and polyphenylene ether and offset their defects, various blend compositions have been proposed. For example, a composition has been proposed for improvement of processability and tensile strength (Japanese Patent Kokoku No. 42-7069). However, this composition does not necessarily suffice the relatively high level of mechanical strength which is required in industrial fields. Furthermore, for improving compatibility between polyolefin and polyphenylene ether resin to enhance mechanical strength, for example, a composition to which a styrene-butadiene block copolymer or its hydrogenated product is added (Japanese Patent Kokai Nos. 53-71158, 54-88960 and 59-100159) and the above composition to which inorganic filler is added (Japanese patent Kokai No. 58-103556) have been proposed. According to these proposals, processability and mechanical strength can be improved, but the organic solvent resistance possessed by polyolefin cannot be sufficiently exhibited for the reasons that amount of polyolefin added is smaller or matrix (continuous phase) comprises polyphenylene ether resin or combination of polyphenylene ether resin and styrene resin and the like. Moreover, there has been proposed a composition which comprises polyphenylene ether and a large amount (more than 20% by weight) of polyolefin to which are further added a diblock copolymer or radial teleblock copolymer composed of alkenyl aromatic compound and conjugated diene or hydrogenated polymers thereof as a compatibilizing agent (Japanese Patent Kokai Nos. 58-103557 and 60-76547). That is, it is said that a blend of a low-density polyethylene as polyolefin and polyphenylene ether resin has been improved in compatibility and can be improved in tensile characteristics and fragility by the addition of hydrogenated product of alkenyl aromatic compound - conjugated diene block copolymer. However, improvement only in compatibility is not enough to satisfy various properties required for common resins. For example, the composition disclosed in Japanese Patent Kokai No. 60-76547, namely, a resin composition comprising the three components of a polyphenylene ether, a low-density polyethylene as polyolefin, a component of large amount, and a hydrogenated product of alkenyl aromatic compound-conjugated diene block copolymer as a compatibilizing agent for the former two components has limitation in its use owing to its very low rigidity level. Among the above-mentioned combinations, resin compositions which contain polypropylene as polyolefin are somewhat improved in rigidity and heat resistance, but these are still not enough in practical use and further improvement has been desired.

The inventors have conducted intensive research in an attempt to make further improvement and to provide resin compositions which can satisfy balance of mechanical strength of relatively high level and solvent resistance and processability of relatively high level which are required in various uses such as fields of industrial parts.

As a result of investigation conducted by the inventors on polyphenylene ether resin, polyolefin and various additives, it has been found that a resin composition which shows excellent balance of mechanical properties and is superior in solvent resistance and processability can be obtained by adding a hydrogenated product of an alkenyl aromatic compound-conjugated diene block copolymer of a specific structure and an alkenyl aromatic compound-conjugated diene block copolymer to combination of polyphenylene ether resin and polyolefin, preferably crystalline polyolefin. Thus, the present invention has been accomplished.

SUMMARY OF THE INVENTION

The present invention is a resin composition which comprises:
(a) a polyolefin resin in an amount of 20-95% by weight,
(b) a polyphenylene ether resin in an amount of 80-5% by weight,
(c) a partially hydrogenated alkenyl aromatic compound-isoprene block copolymer in an amount of 3-45 parts by weight based on totally 100 parts by weight of the components (a) and (b), and
(d) a copolymer elastomer or copolymer selected from the group consisting of an ethylene-α-olefin copolymer elastomer modified with an unsaturated monocarboxylic acid or an derivative thereof, an unsaturated dicarboxylic acid or a derivative thereof, a styrene compound or an unsaturated epoxy compound and a copolymer of α-olefin of 2-6 carbon atoms and alkyl (meth)acrylate having an alkyl group of 1-8 carbon atoms in an amount of 3-45 parts by weight based on totally 100 parts by weight of the components (a) and (b).

DESCRIPTION OF THE INVENTION

Component (a): Polyolefin resin:
Polyolefins used in the present invention include, for example, homopolymers of α-olefins of 3 or more carbon atoms such as propylene, butene-1, pentene-1, hexene-1, 3-methylbutene-1, 4-methylpentene-1, heptene-1, and octene-1, copolymers of predominant amount of these α-olefins and α-olefin containing ethylene in the form of random copolymer, block copolymer and the like and mixtures thereof, copolymers such as random, block, and graft copolymers of a predominant amount of α-olefins of 3 or more carbon atoms and other unsaturated monomers, and oxidized, halogenated or sulfonated products of these polymers. Preferred are those which are at least partially crystalline.

As the other unsaturated monomers, there may be used unsaturated organic acids or derivatives thereof such as acrylic acid, methacrylic acid, maleic acid, itaconic acid, methyl acrylate, ethyl acrylate, methyl methacrylate, maleic anhydride, arylmaleic acid amide, and alkylmaleic acid imide; vinyl esters such as vinyl acetate and vinyl butyrate; aromatic vinyl compounds such as styrene and methylstyrene; vinyl silanes such as vinyltrimethylmethoxysilane and γ-methacryloyloxypropyltrimethoxysilane; and non-conjugated dienes such as dicyclopentadiene, 4-ethylidene-2-norbornene, 4-methyl-1,4-hexadiene and 5-methyl-1,4-hexadiene.

In case of copolymers, these may comprise not only two of α-olefins or other monomers, but also more than two of them.

These polymers can be obtained by polymerization or modification according to known processes and besides, commercially available polymers may be optionally chosen and used. Combination of them can naturally be employed.

Among them, preferred are homopolymers of propylene, butene-1,3-methylbutene-1 or 4-methylpentene-1 and copolymers containing a predominant amount of these monomers. Among them, crystalline propylene polymers, namely, crystalline propylene homopolymer, crystalline propylene-ethylene block or random copolymer, and mixtures of these crystalline propylene polymers with α-olefin rubbers, namely, rubber-like copolymers comprising a plurality of α-olefins or rubber-like copolymers of a plurality of α-olefins and non-conjugated dienes are especially preferred from the point of balance in mechanical properties.

Melt flow rate (MFR) (230° C., load 2.16 kg) of these crystalline propylene polymers and mixtures containing these crystalline propylene polymers and α-olefin rubbers is preferably within the range of 0.01-400, more within the range of 0.15-60. If MFR is less than 0.01, the composition often has problems in processability and if it is more than 400, level of mechanical strength is low and this is not preferred.

Polyolefins include those which have come to have an MFR within the above range by allowing polyolefins having smaller MFR, namely, larger molecular weight to undergo change in molecular weight according to known method, for example, heat treatment in the presence or absence of free-radical initiator (organic or inorganic peroxides, organotin compounds, organic azo compounds, etc.) or heating and mechanical shearing at melt kneading.

Component (b): Polyphenylene ether resin

The polyphenylene ether resin used in the present invention has a recurring unit represented by the following formula:

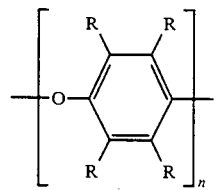

wherein the ether oxygen atom in one unit links to benzene nucleus in the next adjacent unit; n is at least a plurality of R each represents a monovalent substituent selected from the group consisting of hydrogen, halogen, hydrocarbon group containing no tertiary α-carbon atom, halohydrocarbon group having at least two carbon atoms between halogen atom and phenyl nucleus, hydrocarbon oxy group and halohydrocarbon oxy group having at least two carbon atoms between halogen atom and phenyl nucleus.

Typical examples of polyphenylene ethers are the following and analogs thereof.
Poly(2,6-dimethyl-1,4-phenylene) ether,
Poly(2,6-diethyl-1,4-phenylene) ether,
Poly(2-methyl-6-ethyl-1,4-phenylene) ether,
Poly(2-methyl-6-propyl-1,4-phenylene) ether,
Poly(2,6-dipropyl-1,4-phenylene) ether,
Poly(2-ethyl-6-propyl-1,4-phenylene) ether,
Poly(2,6-dibutyl-1,4-phenylene) ether,
Poly(2,6-dipropenyl-1,4-phenylene) ether,
Poly(2,6-dilauryl-1,4-phenylene) ether,
Poly(2,6-diphenyl-1,4-phenylene) ether,
Poly(2,6-dimethoxy-1,4-phenylene) ether,
Poly(2,6-diethoxy-1,4-phenylene) ether,
Poly(2-methoxy-6-ethoxy-1,4-phenylene) ether,
Poly(2-ethyl-6-stearyloxy-1,4-phenylene) ether,
Poly(2,6-dichloro-1,4-phenylene) ether,
Poly(2-methyl-6-phenyl-1,4-phenylene) ether,
Poly(2,6-dibenzyl-1,4-phenylene) ether,
Poly(2-ethoxy-1,4-phenylene) ether,
Poly(2-chloro-1,4-phenylene) ether,
Poly(2,5-dibromo-1,4-phenylene) ether.

Further examples are copolymers such as copolymer of 2,6-dimethylphenol and 2,3,6-trimethylphenol, copolymer of 2,6-dimethylphenol and 2,3,5,6-tetramethylphenol and copolymer of 2,6-diethylphenol and 2,3,6-trimethylphenol.

The polyphenylene ethers used in the present invention further include modified polyphenylene ethers such as polyphenylene ethers defined by the above-mentioned formula on which a styrene monomer (e.g., styrene, p-methylstyrene, and α-methylstyrene) is grafted.

Processes for preparation of these polyphenylene ethers have been known as disclosed, for example, in U.S. Pat. Nos. 3,306,874, 3,306,875, 3,257,357, and 3,257,358, Japanese Patent Kokoku No. 52-17880 and Japanese Patent Kokai No. 50-51197.

Polyphenylene ethers preferred for attaining the objects of the present invention are those which have alkyl substituents in the two ortho positions in respect to the ether oxygen atom and copolymers of 2,6-dialkylphenol and 2,3,6-trialkylphenol.

Among them, polymers of 2,6-dimethylphenol are especially preferred. Further, molecular weight of the polyphenylene ethers in terms of intrinsic viscosity measured in chloroform at 25° C is preferably within the range of 0.2–0.7 dl/g, more preferably within the range of 0.25–0.6 dl/g and further preferably within the range of 0.3–0.55 dl/g. If the intrinsic viscosity is less than 0.2 dl/g, mechanical strength of composition is insufficient and if more than 0.7 dl/g, processability of the composition is deteriorated.

Furthermore, polyphenylene ethers may be replaced with styrene resins such as polystyrene, high-impact polystyrene reinforced with various rubbers and ABS resin in an amount of less than half of the weight of polyphenylene ethers.

Component (c): Partially hydrogenated alkenyl aromatic compound-isoprene copolymer:

The partially hydrogenated alkenyl aromatic compound-isoprene block copolymer used in the present invention is an alkenyl aromatic compound-isoprene block copolymer which has a structure containing at least one chain block "A" originating from the alkenyl aromatic compound and at least one chain block "B" originating from the isoprene and in which content of aliphatic unsaturated group in the block B is reduced by hydrogenation. Arrangement of block A and block B includes linear structure and branched structure, so-called radial teleblock structure.

Distribution of monomer components is not critical and may be uniform or ununiform and furthermore may be tapered with increase or decrease in the amount of monomer components along molecular chain. Therefore, respective molecular weights of a plurality of block A and block B may be the same or different. Moreover, a part of these structures may contain random chain originating from random copolymer portion of alkenyl aromatic compound and isoprene. Among them, preferred are linear structures such as diblock (A-B blocks), triblock (A-B-A blocks, B-A-B blocks), tetrablock (A-B-A-B blocks), pentablock (A-B-A-B-A blocks, B-A-B-A-B blocks) and those which have totally 6 or more A and B blocks. More preferred are diblock, triblock and tetrablock structures and A-B diblock structure is especially preferred.

The alkenyl aromatic compound which constitutes block A has the chemical structure represented by the following formula.

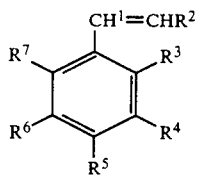

wherein $R^1$ and $R^2$ each represents hydrogen atom or a lower alkyl or alkenyl group of 1–6 carbon atoms, $R^3$ and $R^4$ each represents a hydrogen atom, a lower alkyl group of 1–6 carbon atoms, a chlorine atom or a bromine atom, and $R^5$, $R^6$ and $R^7$ each represents a hydrogen atom or a lower alkyl or alkenyl group of 1–6 carbon atoms and $R^6$ and $R^7$ may link together with a hydrocarbyl group to form a naphthyl group together with the benzene ring.

Examples of the alkenyl aromatic compound include styrene, p-methylstyrene, α-methylstyrene, vinylxylene, vinyltoluene, vinylnaphthalene, divinylbenzene, bromostyrene and chlorostyrene and these may also be used in combination. Among them, styrene, α-methylstyrene, p-methylstyrene, vinyltoluene, and vinylxylene are preferred and styrene is more preferred.

Proportion of the recurring unit originating from alkenyl aromatic compound in the partially hydrogenated alkenyl aromatic compound-isoprene block copolymer (c) is preferably more than 20% by weight and at most 80% by weight, more preferably 25–65% by weight. If the proportion is more than 80% by weight, impact strength of resin composition is deteriorated to unsatisfactory level and if it is 20% by weight or less, rigidity level and heat resistance of resin composition are insufficient and the objects of the present invention cannot be attained.

In the aliphatic chain portion of the block copolymer (c), proportion of unsaturated bond originating from isoprene and remaining without being hydrogenated is preferably 50% by weight or less, more preferably 20% by weight or less, further preferably 10% by weight or less. Further, about 25% by weight or less of aromatic unsaturated bond originating from alkenyl aromatic compound may be hydrogenated.

The hydrogenated block copolymer (c) has a number-average molecular weight (obtained according to polystyrene conversion method from values measured by gel permeation chromatography) of preferably 5,000–500,000 g/mol, more preferably 10,000–300,000 g/mol, still further preferably 30,000–200,000, especially 45,000–150,000 g/mol. If the number-average molecular weight is more than 500,000 g/mol or less than 5,000 g/mol, production cost is apt to increase.

Measurement by gel permeation chromatography was carried out by using monodispersed polystyrene as standard material in obtaining relation between elution time and molecular weight. The average molecular weight was in terms of polystyrene.

Molecular weight distribution of the hydrogenated block copolymer (c) can be measured by the above gel permeation chromatography, but preferred molecular weight distribution is not limited and besides so-called value Q obtained by dividing value of weight-average molecular weight by that of number-average molecular weight may be within any range. Moreover, the molecular weight distribution may have not only one peak, but also two or more peaks. Moreover, the block copolymer (c) may be such that containing, in addition to the component of peak of main dispersion, a small amount of components of higher or lower molecular weight than that of the component of the peak of main dispersion, in other words, having shape of molecular weight distribution comprising a peak of main dispersion having the foot descending by a gradual slope.

The alkenyl aromatic chain block (block A) and the hydrogenated isoprene chain block (block B) in the hydrogenated block copolymer (c) may be of any molecular weight as far as it satisfies the above-mentioned number-average molecular weight and may be of any combinations.

These hydrogenated block copolymers (c) have hydrogenated isoprene polymer chain portion and some of them show crystallinity originating from this chain. It is considered that this is because the hydrogenated isoprene polymer chain has a molecular structure similar to polyolefin. Crystallinity of the hydrogenated block copolymer (c) can be measured by differential scanning calorimeter (DSC).

The hydrogenated block copolymers (c) usable in the present invention may be of any crystallinity.

The hydrogenated block copolymers (c) may have any glass transition temperatures based on the hydrogenated isoprene polymer chain portion.

The glass transition temperature can be measured by the above-mentioned DSC method or based on change of viscoelasticity with temperature measured by mechanical spectrometer or the like.

Many processes have been proposed for producing alkenyl aromatic compound-isoprene block copolymers. Typical processes are disclosed, for example, in Japanese Patent Kokoku No. 40-23798, U.S. Patent Nos. 3,595,942 and 4,090,996. According to these processes, block copolymerization is carried out in an inert solvent such as cyclohexane using lithium catalyst, Ziegler catalyst or the like. One of these block copolymers is supplied from Japan Synthetic Rubber Co., Ltd. by the trademark of "TR2400". Hydrogenation treatment of these block copolymers is carried out by hydrogenation in an inert solvent such as cyclohexane in the presence of hydrogenation catalyst according to the processes disclosed in Japanese Patent Kokoku Nos. 42-8704, 43-6636 and 46-20814.

Furthermore, it is also possible to carry out hydrogenation in an inert solvent using p-toluenesulfonylhydroazide by the process disclosed in "Journal of Polymer Science Part B Polymer Letters, Volume 11, pages 427–434 (1973).

Component (d): (1) Modified ethylene elastomers:

Modified ethylene-α-olefin copolymers used in the present invention are ethylene-α-olefin copolymers on which is grafted an unsaturated monocarboxylic acid or derivative thereof, an unsaturated dicarboxylic acid or derivative thereof, a styrene compound or an unsaturated epoxy compound.

The ethylene-α-olefin copolymer which is to be subjected to graft modification has an ethylene content of 30–93 mol%, preferably 35–90 mol%. If the ethylene content is more than 93 mol% or less than 30 mol%, the ethylene-α-olefin copolymer becomes highly crystalline and effect to improve impact resistance of composition is not sufficient. Furthermore, melt flow rate of the ethylene-α-olefin copolymer at 190° C. [MFR, measured at 190° C. under a load of 2160 g (ASTM D-1238 Condition E)] is preferably 0.1–50 g/10 min, especially preferably 0.2–20 g/10 min. If MFR is less than 0.1 g/10 min or more than 50 g/10 min, effect to improve impact resistance tends to decrease.

Density of the ethylene-α-olefin copolymer is preferably 0.90 g/cm$^3$ or less, more preferably 0.85–0.89 g/cm$^3$. Moreover, the ethylene-α-olefin copolymer is preferably low-crystalline or non-crystalline and the crystallinity is usually 0–50%, preferably 0–40%.

The α-olefin unit which constitutes the ethylene-α-olefin copolymer is α-olefin of 3-18 carbon atoms such as 1-butene, 1-hexene, 4-methyl-1-pentene, and 1-decene. These may be used singly or as mixtures of two or more. The ethylene-α-olefin copolymer is usually a copolymer of ethylene component and α-olefin component, but may contain a diene component in an amount of at most 5 mol%.

Typical example of diene component is dicyclopentadiene and ethylidene norbornane.

Graft monomers to be grafted on the ethylene-α-olefin copolymer are one or more compounds selected from unsaturated monocarboxylic acids and derivatives thereof, one or more compounds selected from unsaturated dicarboxylic acids or derivatives thereof, one or more styrene compounds or one or more unsaturated epoxy compounds.

As examples of the unsaturated monocarboxylic acids and derivatives thereof, mention may be made of methacrylic acid, acrylic acid, isocrotonic acid, crotonic acid, vinylacetic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, and tetracosenoic acid. Derivatives thereof include, for example, acid halides, amides, imides, anhydrides and esters. Among them, preferred are acrylic acid, methacrylic acid and methyl methacrylate.

As examples of the unsaturated dicarboxylic acids and derivatives thereof to be grafted on the ethylene-α-olefin copolymer, mention may be made of unsaturated dicarboxylic acids such as maleic acid, tetrahydrophthalic acid, itaconic acid, fumaric acid, citraconic acid, and nadic acid (endo-cis-bicyclo[2,2,1]hepto-5-en-2,3-dicarboxylic acid) and derivatives thereof, e.g., acid halides, amides, imides, anhydrides and esters such as maleimide, maleic anhydride, citraconic anhydride, monomethyl maleate, dimethyl maleate, and glycidyl maleate. Among them, preferred are maleic anhydride, maleic acid, fumaric acid and nadic anhydride.

The styrene compounds to be grafted on the ethylene-α-olefin copolymer are the alkenyl aromatic compounds mentioned above. Other monomers copolymerizable with a predominant amount of the styrene compound may be used in combination with the styrene compound. Such monomers include, for example, acrylic acid, methacrylic acid, maleic acid, maleic anhydride, methyl acrylate, ethyl acrylate, methyl methacrylate, glycidyl methacrylate, glycidyl acrylate and maleimide.

The unsaturated epoxy compounds to be grafted on the ethylene-α-olefin copolymer are compounds having both unsaturated bond and epoxy group in their molecule and examples thereof are glycidyl esters of unsaturated carboxylic acids.

Examples of the unsaturated carboxylic acids are as follows:

Acrylic acid, isocrotonic acid, crotonic acid, vinylacetic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, tetracosenoic acid, maleic acid, tetrahydrophthalic acid, itaconic acid, fumaric acid, citraconic acid, and nadic acid (endo-cis-bicyclo[2,2,1]hepto-5-en-2,3-dicarboxylic acid).

Other examples of the unsaturated epoxy compounds are allylglycidyl ether, vinylglycidyl ether, and cyclohexene epoxide.

These may be used singly or in combination of two or more.

Graft ratio of the unsaturated monocarboxylic acid or derivatives thereof, the unsaturated dicarboxylic acids or derivatives thereof, and the unsaturated epoxy compounds as graft monomers is 0.05–10 parts by weight, especially 0.1–5 parts by weight based on 100 parts by weight of the ethylene-α-olefin copolymer. If the graft ratio is less than 0.05 part by weight, compatibility with polyphenylene ether resins is inferior and laminar peeling is apt to occur and besides, effect to improve impact resistance is also apt to decrease. If the graft ratio is more than 10 parts by weight, crosslinking degree of the graft modified product increases and even if it is added to polyphenylene ether resin, effect to improve impact resistance tends to decrease.

Graft ratio of the styrene compounds as graft monomers is preferably 0.3–50 parts by weight, especially preferably 1–20 parts by weight based on 100 parts by weight of the ethylene-α-olefin copolymer. If the graft ratio is less than 0.3 part by weight, compatibility with the polyphenylene ether resin is inferior and laminar peeling is apt to occur and besides, effect to improve impact resistance is small. If the graft ratio is more than 50 parts by weight, the graft modified products do not show properties of rubber-like elastic body and effect to improve impact resistance of polyphenylene ether resin decreases.

Further, melt flow rate of the graft-modified ethylene-α-olefin copolymer [MFR, measured at 190° C. under 2,160 g] is 0.1–50 g/10 min, preferably 0.2–20 g/10 min.

At least one compound selected from styrene hydrocarbons such as styrene can be used in combination with the unsaturated monocarboxylic acids or derivatives thereof, unsaturated dicarboxylic acids or derivatives thereof, or unsaturated epoxy compounds as graft monomers. In this case, it is preferred that the unsaturated monocarboxylic acids or derivatives thereof, unsaturated dicarboxylic acids or derivatives thereof, or unsaturated epoxy compounds are used in an amount of about 0.05-about 10% by weight, especially about 0.1-about 5% by weight per 100 parts by weight of the ethylene-α-olefin copolymer and the compound selected from the styrene hydrocarbons is used in an amount of about 0.3-about 50% by weight, especially about 1-about 20% by weight per 100 parts by weight of the ethylene-α-olefin copolymer.

The modified ethylene-α-olefin copolymer used in the present invention is preferably prepared by subjecting the ethylene-α-olefin copolymer directly molten or dissolved in a solvent to graft reaction with addition of the above graft monomers and free-radical initiators. Reactor, extruder, kneader and the like are utilized for the graft reaction.

The free-radical initiators include organic peroxides and organic peresters such as benzoyl peroxide, dichlorobenzoyl peroxide, dicumyl peroxide, di-tertbutyl peroxide, 2,5-dimethyl-2,5-di(peroxide benzoate) hexyne-3, 1,4-bis(tert-butylperoxoisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tertbutyl perphenylacetate, tert-butyl perisobutyrate, tert-butyl per-sec-octoate, tert-butyl perpivalate, cumyl perpivalate and tert-butyl perdiethylacetate and azo compounds such as azobisisobutyronitrile and dimethylazoisobutyrate. Among them, preferred are dicumyl peroxide, di-tert-butyl peroxide, 2,5-dimethyl-2,5-di(tert-butylperoxy)hexyne-3, 2,5-dimethyl-2,5-di(tertbutylperoxy)-hexane and 1,4-bis(tert-butylperoxyisopropyl)benzene.

Component (d): (2) α-olefin-alkyl (meth)acrylate copolymers:

The α-olefin-alkyl (meth)acrylate copolymers used in the present invention are copolymers of one or more α-olefins of 2–6 carbon atoms (such as ethylene, propylene, and butene) with alkyl esters (having 1-8 carbon atoms) of acrylic acid or methacrylic acid.

As examples of these copolymers, mention may be made of ethylene-methyl acrylate, ethylene-ethyl acrylate, ethylene-propylene-methyl acrylate, ethylene-propylene-ethyl acrylate, ethylene-butene-methyl acrylate, ethylene-butene-ethyl acrylate, ethylene-methyl methacrylate, ethylene-ethyl methacrylate, ethylene-propylenemethyl methacrylate, and ethylene-butene-methyl methacrylate copolymers. Among them, ethylene-methyl acrylate and ethylene-ethyl acrylate copolymers are especially preferred. Content of acrylate or methacrylate in the copolymer is preferably about 3–30% by weight.

Moreover, there may also be used the above copolymers into which is introduced a functional group selected from carboxylic acid group, acid anhydride group, acid amide group, imide group, hydroxyl group and epoxy group.

Introduction of these functional groups can be easily carried out by grafting a compound having both the unsaturated bond and the above functional group on an α-olefin-alkyl(meth)acrylate copolymer or copolymerizing said compound with an α-olefin-alkyl (meth)acrylate.

As examples of the functional compounds, mention may be made of unsaturated acid such as vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid, and tetracosenoic acid, maleic acid, tetrahydrophthaic acid, itaconic acid, fumaric acid, citraconic acid, and nadic acid (endo-cisbicyclo[2,2,1]hepto-5-en-2,3-dicarboxylic acid) and acid anhydrides of these unsaturated acids (such as maleic anhydride and nadic anhydride), acid amides of these unsaturated acids (such as acrylic amide, dimethylaminopropylacrylamide and methacrylamide), acid imides of these unsaturated acids (such as maleimide, N-phenylmaleimide, and N-methylmaleimide), hydroxyesters of these unsaturated acids (such as hydroxyethyl acrylate and hydroxyethyl methacrylate), and glycidyl esters (such as glycidyl acrylate and glycidyl methacrylate). Further examples are allylglycidyl ether, vinylglycidyl ether, and cyclohexene epoxide.

Suitable functional compounds are acrylic acid, methacrylic acid, acrylamide, maleic anhydride, nadic anhydride, glycidyl acrylate, glycidyl methacrylate, and maleimide. Content of these functional compounds in the copolymers is preferably 0.1–15% by weight, more preferably 0.5–10% by weight.

Generally, free-radical initiators are used for introduction of the functional compounds.

The free-radical initiators include organic peroxides and organic peresters such as benzoyl peroxide, dichlorobenzoyl peroxide, dicumyl peroxide, di-tertbutyl peroxide, 2,5-dimethyl-2,5-di(peroxide benzoate)-hexyne-3, 1,4-bis(tert-butylperoxoisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tertbutyl perbenzoate, tertbutyl perphenylacetate, tert-butyl perisobutyrate, tertbutyl per-sec-octoate, tert-butyl perpivalate, cumyl perpivalate and tert-butyl perdiethylacetate and azo compounds such as azobisisobutyronitrile and dimethylazoisobutyrate. Among them, preferred are dicumyl peroxide, di-tertbutyl peroxide, 2,5-dimethyl-2,5-di(tert-butylperoxy)-hexyne-3, 2,5-dimethyl-2,5-di(tertbutylperoxy)hexane and 1,4-bis(tert-butylperoxyisopropyl)benzene.

Compositional ratio of components:

Content of polyolefin component (a) in the resin composition of the present invention is preferably 20–95% by weight, more preferably 30–95% by weight, especially preferably 40–90% by weight when total amount of polyolefin (a) and polyphenylene ether resin (b) is assumed to be 100% by weight.

If the content is less than 20% by weight, composition is insufficient in organic solvent resistance and if it is more than 95% by weight, heat resistance is in unsatisfactory level and the object of the present invention cannot be attained.

Similarly, content of polyphenylene ether resin, component (b), is preferably 80–5% by weight, more preferably 70–5% by weight and especially preferably 60–10% by weight when total amount of component (a) and component (b) is assumed to be 100% by weight. If it is less than 5% by weight, level of rigidity is insufficient and if it is more than 80% by weight, organic solvent resistance is insufficient.

Content of the partially hydrogenated alkenyl aromatic compound-isoprene block copolymer, the component (c), is preferably 3–45 parts by weight, more preferably 5–40 parts by weight, especially preferably 5–30 parts by weight based on totally 100 parts by weight of component (a) and component (b). If it is less than 3 parts by weight, level of impact strength is unsatisfactory and if it is more than 45 parts by weight, level of rigidity is unsatisfactory and the object of the present invention cannot be attained.

Content of the modified ethylene-α-olefin copolymer elastomer or the α-olefin-alkyl (meth)acrylate copolymer, component (d), is preferably 3–45 parts by weight, more preferably 5–30 parts by weight based on totally 100 parts by weight of component (a) and component (b). If it is less than 3 parts by weight, level of impact strength is insufficient and if it is more than 45 parts by weight, level of rigidity is unsatisfactory and the object of the present invention cannot be attained.

The resin composition of the present invention may contain, in addition to the above components, auxiliary components as far as the effects of the present invention are not damaged. Examples of these components are antioxidant, weathering modifier, nucleating agent for polyolefin, slip agent, inorganic or organic filler and reinforcing agent, flame retardant, various colorants, antistatic agent, releasing agent, and a small amount of free-radical former (organic peroxides, etc.) for molecular weight regulation of polyolefins.

Furthermore, plasticizer such as triphenyl phosphate used for polyphenylene resin, and furthermore, fillers such as glass fiber, wollastonite, potassium titanate, whisker, mica, talc, and calcium carbonate are effective for improvement of balance of properties such as rigidity and improvement of processability, dimensional accuracy, and dimensional stability.

Method of blending:

As method of blending for obtaining the resin composition of the present invention, various methods can be employed which are generally used for blending of resins per se; resins and stabilizer or colorant; resins and filler; and the like. For example, respective components in the form of powder or particle are made into a homogeneously dispersed mixture by Henschel mixer, super mixer, ribbon blender, V blender, etc. Then, the mixture is melt kneaded by twin-screw extruder, single-screw extruder, rolls, Banbury mixer, blast mill, melt kneader with Brabender Plastograph, etc. Melt kneading temperature is usually 200°–350° C. The thus obtained resin composition can be extruded into pellets after melt kneading.

Application of the resin composition of the present invention:

The resin composition of the present invention can be easily molded by molding methods generally applied to thermoplastic resins, namely, injection molding, extrusion molding, blow molding, etc., among which injection molding is most preferred. Because of its good mechanical properties, the composition is suitable for automobile parts, specifically, exterior trim parts such as bumper, door, door panel, fender, ornament, emblem, wheel cover, engine hood, roof, and spoiler, internal trim parts such as instrument panel, console box, and trim, exterior parts of electrical equipments such as television, refrigerator, and so-called office automation equipments.

The present invention will be explained by the following nonlimiting examples and comparative examples.

Methods for measurement and evaluation:

In the following Examples and Comparative Examples, properties were measured and evaluated under the following conditions.

(1) MFR (for indication of flowability)

MFR of polyolefin was measured according to JIS K 7210-1975.

(2) Flexural modulus (for indication of rigidity):

This was measured in accordance with ISO R 178-1974 Procedure 12 (JIS K 7203) using Instron tester.

(3) Izod impact strength:

This was measured in accordance with ISO R 180-1969 (JIS K 7110) (notched Izod impact strength) using Izod impact tester manufactured by Toyo Seiki Seisakusho Co., Ltd.

(4) Heat distortion temperature (for indication of heat resistance)

This was measured in accordance with ISO R 75-1958 Method A (JIS K 7207-1974 A) using an injection molded test piece subjected to annealing treatment at 100° C. for 30 minutes.

REFERENCE EXAMPLE 1

Preparation of acrylic acid-graft modified ethylene-propylene copolymer:

100 Parts by weight of ethylene-propylene copolymer [ESPRENE E-120 (trademark) manufactured by Sumitomo Chemical Co., Ltd.), 3 parts by weight of acrylic acid and 0.1 part by weight of 2,5-dimethyl-2,5-di(t-butylperoxy)hexyne-3 were well mixed by a super mixer and the mixture was melt kneaded at 230° C by a twin-screw extruder [TEM-50 (trademark) manufactured by Toshiba Machine Co., Ltd.). It was confirmed by oxygen analysis that 2.1% by weight of acrylic acid was graft copolymerized in the resulting modified ethylene-propylene copolymer.

EXAMPLE 1

A propylene homopolymer [SUMITOMO NOBRENE D-501 (trademark) manufactured by Sumitomo Chemical Co., Ltd.], poly-(2,6-dimethylphenylene) ether (manufactured by Sumitomo Chemical Co., Ltd.), a hydrogenated styreneisoprene block copolymer (hereinafter referred to as "hydrogenated SI") [KRATON G1701X (trademark) manufactured by Shell Chemical CO.), and the acrylic acid-grafted ethylene-propylene copolymer obtained in Reference Example 1 were mixed at a mixing ratio as shown in Table 1 by a super mixer. The resulting mixture was melt kneaded by a twin-screw extruder [TEM-50 manufactured by Toshiba Machine Co., Ltd.) at 260°-280° C. to obtain pellets. Measurement of properties was carried out and the results are shown in Table 1.

COMPARATIVE EXAMPLE 1

Pellets were prepared in the same manner as in Example 1 except that a hydrogenated styrene-butadienestyrene block copolymer (hereinafter referred to as "hydrogenated SB") [KRATON G-1650 (trademark) manufactured by Shell Chemical Co.]was used in place of the hydrogenated styrene-isoprene block copolymer. Results of measurement of properties are shown in Table 1.

COMPARATIVE EXAMPLE 2

Pellets were prepared in the same manner as in Example 1 except that unmodified ethylene-propylene copolymer (ESPRENE E-120 (trademark) manufactured by Sumitomo Chemical Co., Ltd.) was used in place of the acrylic acid-grafted ethylene-propylene copolymer. Measurement of properties was conducted to obtain the results as shown in Table 1.

COMPARATIVE EXAMPLE 3

Pellets were prepared in the same manner as in Example 1 except that the acrylic acid-grafted ethylenepropylene copolymer was not used. Measurement of properties was conducted and the results are shown in Table 1.

As can be seen from comparison of the results of Example 1 with those of Comparative Examples 1-3, the composition of the present invention where hydrogenated styrene-isoprene block copolymer and acrylic acid-modified ethylene-propylene copolymer were combined had peculiarly excellent properties.

TABLE 1

|  |  | Example 1 | Comparative Example 1 | Comparative Example 2 | Comparative Example 3 |
| --- | --- | --- | --- | --- | --- |
| Resin Composition |  |  |  |  |  |
| Polypropylene | Kind | Homopolymer | Homopolymer | Homopolymer | Homopolymer |
|  | MFR (g/10 min) | 0.4 | 0.4 | 0.4 | 0.4 |
|  | Amount (part by weight) | 75 | 75 | 75 | 75 |
| Polyphenylene ether | Intrinsic viscosity (dl/g) | 0.35 | 0.35 | 0.35 | 0.35 |
|  | Amount (part by weight) | 25 | 25 | 25 | 25 |
| Hydrogenated styrene-conjugated diene block copolymer | Kind | Hydrogenated SI | Hydrogenated SB | Hydrogenated SI | Hydrogenated SI |
|  | Amount (part by weight) | 5 | 5 | 5 | 15 |
| Acrylic acid grafted ethylene-propylene copolymer | Amount (part by weight) | 10 | 10 | — | — |
| Ethylene-propylene copolymer | Amount (part by weight) | — | — | 10 | — |
| Properties of Composition |  |  |  |  |  |
| Flexural modulus (23° C., Kg/cm$^2$) |  | 11,700 | 7,700 | 10,300 | 8,700 |
| Heat distortion temperature (4.6 Kg load, °C.) |  | 143 | 122 | 131 | 123 |

TABLE 1-continued

|  |  | Example 1 | Comparative Example 1 | Comparative Example 2 | Comparative Example 3 |
|---|---|---|---|---|---|
| Izod impact strength Kg · cm/cm | 23° C. | 41 | 23 | 12 | 29 |
|  | −30° C. | 12 | 6 | 5 | 7 |
| Surface appearance of molded articles |  | Good | Whitened | Whitened | Good |

EXAMPLES 2-6

Pellets were prepared in the same manner as in Example 1 at a mixing ratio of the components as shown in Table 2 and properties were evaluated. The results are shown in Table 2. Components used in Table 2 are as follows:

Propylene:

Homopolymer: SUMITOMO NOBRENE D-501 (trademark) manufactured by Sumitomo Chemical Co., Ltd.

Random copolymer: Propylene-ethylene random copolymer [SUMITOMO NOBRENE S-131 (trademark) manufactured by Sumitomo Chemical Co., Ltd.]

Block copolymer: Propylene-ethylene block copolymer [SUMITOMO NOBRENE AS-171A (trademark) manufactured by Sumitomo Chemical Co., Ltd.]

Polyphenylene ether; Poly-(2,6-dimethylphenylene) ether (manufactured by Sumitomo Chemical Co., Ltd.)

Hydrogenated SI: KRATON G-1701X (trademark) manufactured by Shell Chemical Co.

Modified ethylene-α-olefin copolymer:

AA-EP(1): Acrylic acid-modified ethylene-propylene copolymer (obtained in Reference Example 1)

AA-EP(2): Acrylic acid-modified ethylene-propyleneethylidene norbornane copolymer (prepared as in Reference Example 1 except that ESPRENE E-501A was used in place of ESPRENE E-120)

MAA-EP: Methacrylic acid-modified ethylene-propylene copolymer (prepared as in Reference Example 1 except that methacrylic acid was used in place of acrylic acid)

MMA-EP: Methyl methacrylate-modified ethylenepropylene copolymer [ethylene/propylene=about 8/2 (molar ratio) and methyl methacrylate 1.3% by weight)

AA-EB: Acrylic acid-modified ethylene-butene copolymer [ethylene/butene=about 8/2 (weight ratio) and acrylic acid 1.2% by weight]

TABLE 2

|  |  | Example 2 | Example 3 | Example 4 | Example 5 | Example 6 |
|---|---|---|---|---|---|---|
| Resin composition |  |  |  |  |  |  |
| Polypropylene | Kind | Homopolymer | Homopolymer | Random copolymer | Block Copolymer | Homopolymer |
|  | Amount (part by weight) | 70 | 40 | 90 | 80 | 85 |
| Polyphenylene ether | Intrinsic viscosity (dl/g) | 0.40 | 0.40 | 0.45 | 0.38 | 0.40 |
|  | Amount (part by weight) | 30 | 60 | 10 | 20 | 15 |
| Hydrogenated SI | Amount (part by weight) | 10 | 3 | 5 | 15 | 4 |
| Modified ethylene-α-olefin copolymer | Kind | AA-EP (1) | AA-EP (2) | MAA-EP | MAA-EP | AA-EB |
|  | Amount (part by weight) | 5 | 15 | 12 | 7 | 15 |
| Properties of composition |  |  |  |  |  |  |
| Flexural modulus (23° C., Kg/cm$^2$) |  | 10,300 | 13,600 | 8,700 | 9,800 | 11,000 |
| Heat distortion temperature (4.6 Kg load, °C.) |  | 135 | 152 | 139 | 123 | 141 |
| Izod impact strength (Kg · cm/cm) | 23° C. | 36 | 29 | 31 | 27 | 33 |
|  | −30° C. | 11 | 12 | 8 | 10 | 11 |

REFERENCE EXAMPLE 2

Preparation of maleic anhydride-graft modified ethylene-propylene copolymer:

100 Parts by weight of ethylene-propylene copolymer [ESPRENE E-120 (trademark) manufactured by Sumitomo Chemical Co., Ltd.), 2 parts by weight of maleic anhydride and 0.1 part by weight of dicumyl peroxide were well mixed by a super mixer and the mixture was melt kneaded at 230° C by a twin-screw extruder [TEM-50 (trademark) manufactured by Toshiba Machine Co., Ltd.). It was found that 1.1% by weight of maleic anhydride was graft copolymerized in the resulting modified ethylene-propylene copolymer.

EXAMPLE 7

A propylene homopolymer [SUMITOMO NOBRENE D-501 (trademark) manufactured by Sumitomo Chemical Co., Ltd.], poly-(2,6-dimethylphenylene) ether (manufactured by Sumitomo Chemical Co., Ltd.), a hydrogenated styreneisoprene block copolymer (hereinafter referred to as "hydrogenated SI") [KRATON G1701X (trademark) manufactured by Shell Chemical Co.), and the maleic anhydride-grafted ethylene-propylene copolymer obtained in Reference Example 2 were mixed at a mixing ratio as shown in Table 3 by a super mixer. The resulting mixture was melt kneaded by a twin-screw extruder [TEM-50 manufactured by Toshiba Machine Co., Ltd.) at 260°–280° C. to obtain pellets. Measurement of properties was carried out and the results are shown in Table 3.

As can be seen from comparison of the results of Example 7 with those of Comparative Examples 1-3, the composition of the present invention where hydrogenated styrene-isoprene block copolymer and maleic anhydride-modified ethylene-propylene copolymer were combined had peculiarly excellent properties.

Block copolymer: Propylene-ethylene block copolymer [SUMITOMO NOBRENE AS-171A (trademark) manufactured by Sumitomo Chemical Co., Ltd.]

Polyphenylene ether: Poly-(2,6-dimethylphenylene) ether (manufactured by Sumitomo Chemical Co., Ltd.)

TABLE 3

|  |  | Example 7 | Comparative Example 1 | Comparative Example 2 | Comparative Example 3 |
| --- | --- | --- | --- | --- | --- |
| Resin composition |  |  |  |  |  |
| Polypropylene | Kind | Homopolymer | Homopolymer | Homopolymer | Homopolymer |
|  | MFR (g/10 min) | 0.4 | 0.4 | 0.4 | 0.4 |
|  | Amount (part by weight) | 75 | 75 | 75 | 75 |
| Polyphenylene ether | Intrinsic viscosity (dl/g) | 0.35 | 0.35 | 0.35 | 0.35 |
|  | Amount (part by weight) | 25 | 25 | 25 | 25 |
| Hydrogenated styrene-conjugated diene block copolymer | Kind | Hydrogenated SI | Hydrogenated SB | Hydrogenated SI | Hydrogenated SI |
|  | Amount (part by weight) | 5 | 5 | 5 | 15 |
| Maleic anhydride grafted ethylene-propylene copolymer | Amount (part by weight) | 10 | 10 | — | — |
| Ethylene-propylene copolymer | Amount (part by weight) | — | — | 10 | — |
| Properties of composition |  |  |  |  |  |
| Flexural modulus (23° C., Kg/cm$^2$) |  | 10,700 | 7,700 | 10,300 | 8,700 |
| Heat distortion temperature (4.6 Kg load, °C.) |  | 141 | 122 | 131 | 123 |
| Izod impact strength (Kg · cm/cm) | 23° C. | 43 | 23 | 12 | 29 |
|  | −30° C. | 12 | 6 | 5 | 7 |
| Surface appearance of molded articles |  | Good | Whitened | Whitened | Good |

EXAMPLES 8-13

Pellets were prepared in the same manner as in Example 7 at a mixing ratio of the components as shown in Table 4 and properties were evaluated. The results are shown in Table 4. Components used in Table 4 are as follows:

Polypropylene:
Homopolymer: SUMITOMO NOBRENE D-501 (trademark) manufactured by Sumitomo Chemical Co., Ltd.
Random copolymer: Propylene-ethylene random copolymer [SUMITOMO NOBRENE S-131 (trademark) manufactured by Sumitomo Chemical Co., Ltd.]

Hydrogenated SI: KRATON G-1701X (trademark) manufactured by Shell Chemical Co.
Modified ethylene-α-olefin copolymer:
M-EP(1) Maleic anhydride-modified ethylene-propylene copolymer (obtained in Reference Example 2)
M-EP(2): Maleic anhydride-modified ethylene-propylene-ethylidene norbornane copolymer (prepared as in Reference Example 2 except that ESPRENE E-501A was used in place of ESPRENE E-120)
M-EB: Maleic anhydride-modified ethylene-butene-1 copolymer [ethylene/butene=about 83/17 (weight ratio) and maleic anhydride 1.2% by weight]
H-EP: Nadic anhydride-modified ethylene-propylene copolymer [ethylene/propylene=about 8/2 (molar ratio) and nadic anhydride 1.5% by weight]
MA-EP: Maleic acid-modified ethylene-propylene copolymer [ethylene/propylene=about 5/5 (molar ratio) and maleic acid 1.1% by weight]

TABLE 4

|  |  | Example 8 | Example 9 | Example 10 | Example 11 | Example 12 | Example 13 |
| --- | --- | --- | --- | --- | --- | --- | --- |
| Resin composition |  |  |  |  |  |  |  |
| Polypropylene | Kind | Homopolymer | Random copolymer | Block copolymer | Homopolymer | Homopolymer | Homopolymer |
|  | Amount (part by weight) | 60 | 40 | 70 | 55 | 60 | 60 |
| Polyphenylene ether | Intrinsic viscosity (dl/g) | 0.45 | 0.43 | 0.38 | 0.40 | 0.40 | 0.40 |
|  | Amount (part by weight) | 40 | 60 | 30 | 45 | 40 | 40 |
| Hydrogenated SI | Amount (part by weight) | 10 | 8 | 5 | 3 | 4 | 4 |
| Modified ethylene-α- | Kind | M-EP(1) | M-EP(2) | M-EB | M-EB | H-EP | MA-EP |
|  | Amount (part | 5 | 5 | 7 | 10 | 15 | 10 |

TABLE 4-continued

|  | | Example 8 | Example 9 | Example 10 | Example 11 | Example 12 | Example 13 |
|---|---|---|---|---|---|---|---|
| olefin copolymer | by weight) | | | | | | |
| Properties of composition | | | | | | | |
| Flexural modulus (23° C., Kg/cm$^2$) | | 12,000 | 12,900 | 10,800 | 13,900 | 10,200 | 11,500 |
| Heat distortion temperature (4.6 Kg load, °C.) | | 135 | 152 | 140 | 142 | 143 | 144 |
| Izod impact strength | 23° C. | 36 | 32 | 29 | 27 | 41 | 33 |
| (Kg · cm/cm) | −30° C. | 10 | 10 | 11 | 10 | 13 | 10 |

REFERENCE EXAMPLE 3

Preparation of styrene-graft modified ethylene-propylene copolymer:

100 Parts by weight of ethylene-propylene copolymer [ESPRENE E-120 (trademark) manufactured by Sumitomo Chemical Co., Ltd.), 40 parts by weight of styrene, 500 parts by weight of water, 1.5 part by weight of benzoyl peroxide, 3 parts by weight of calcium phosphate and 3 parts by weight of polyethylene glycol were charged in a polymerization kettle and atmosphere in the tank was sufficiently replaced with nitrogen under stirring. Then, polymerization was allowed to proceed for 1 hour at 90° C and then for 1 hour at 110° C. Polystyrene in the resulting graft copolymer was extracted with methyl ethyl ketone and as a result it was confirmed that about 20% by weight of styrene was graft copolymerized in the copolymer.

EXAMPLE 14

A propylene homopolymer [SUMITOMO NOBRENE D-501 (trademark) manufactured by Sumitomo Chemical Co., Ltd.], poly-(2,6-dimethylphenylene) ether (manufactured by Sumitomo Chemical Co., Ltd.), a hydrogenated styreneisoprene block copolymer (hereinafter referred to as "hydrogenated SI") [KRATON G1701X (trademark) manufactured by Shell Chemical Co.), and the styrene-grafted ethylene-propylene copolymer obtained in Reference Example 3 were mixed at a mixing ratio as shown in Table 5 by a super mixer. The resulting mixture was melt kneaded by a twin-screw extruder [TEM-50 manufactured by Toshiba Machine Co , Ltd.) at 260°–280° C. to obtain pellets. Measurement of properties was carried out and the results are shown in Table 5.

As can be seen from comparison of the results of Example 14 with those of Comparative Examples 1-3, the composition of the present invention where hydrogenated styrene-isoprene block copolymer and styrene-modified ethylene-propylene copolymer were combined had peculiarly excellent properties.

TABLE 5

|  |  | Example 14 | Comparative Example 1 | Comparative Example 2 | Comparative Example 3 |
|---|---|---|---|---|---|
| Resin composition | | | | | |
| Polypropylene | Kind | Homopolymer | Homopolymer | Homopolymer | Homopolymer |
|  | MFR (g/10 min) | 0.4 | 0.4 | 0.4 | 0.4 |
|  | Amount (part by weight) | 75 | 75 | 75 | 75 |
| Polyphenylene ether | Intrinsic viscosity (dl/g) | 0.35 | 0.35 | 0.35 | 0.35 |
|  | Amount (part by weight) | 25 | 25 | 25 | 25 |
| Hydrogenated styreneconjugated diene block copolymer | Kind | Hydrogenated SI | Hydrogenated SB | Hydrogenated SI | Hydrogenated SI |
|  | Amount (part by weight) | 5 | 5 | 5 | 15 |
| Styrene grafted ethylene-propylene copolymer | Amount (part by weight) | 10 | 10 | — | — |
| Ethylene-propylene copolymer | Amount (part by weight) | — | — | 10 | — |
| Properties of composition | | | | | |
| Flexural modulus (23° C., Kg/cm$^2$) | | 10,300 | 7,700 | 10,300 | 8,700 |
| Heat distortion temperature (4.6 Kg load, °C.) | | 145 | 122 | 131 | 123 |
| Izod impact strength 23° C. | | 42 | 23 | 12 | 29 |
| (Kg · cm/cm) −30° C. | | 12 | 6 | 5 | 7 |
| Surface appearance of molded articles | | Good | Whitened | Whitened | Good |

EXAMPLES 15-18

Pellets were prepared in the same manner as in Example 14 at a mixing ratio of the components as shown in Table 6 and properties were evaluated. The results are shown in Table 6. Components used in Table 6 are as follows:

Polypropylene:
Homopolymer: SUMITOMO NOBRENE D-501 (trademark) manufactured by Sumitomo Chemical Co., Ltd.
Random copolymer: Propylene-ethylene random copolymer [SUMITOMO NOBRE S-131 (trademark) manufactured by Sumitomo Chemical Co., Ltd.]
Block copolymer: Propylene-ethylene block copolymer [SUMITOMO NOBRENE AS-171A (trademark) manufactured by Sumitomo Chemical Co., Ltd.

Polyphenylene ether: Poly-(2,6-dimethylphenylene) ether (manufactured by Sumitomo Chemical Co., Ltd.)

Hydrogenated SI: KRATON G-1701X (trademark) manufactured by Shell Chemical Co.

Modified ethylene-a-olefin copolymer:

S-EP: Styrene-graft modified ethylene-propylene copolymer (obtained in Reference Example 3)

S-EPD: Styrene-graft modified ethylene-propylene-ethylidene norbornane copolymer (prepared as in Reference Example 3 except that ESPRENE E-501A was used in place of ESPRENE E-120)

S-EB: Styrene-graft modified ethylene-butene copolymer [prepared as in Reference Example 3 except that ethylene-butene-1 copolymer (butene content: 15% by weight) was used in place of ESPRENE E-120]

weight of glycidyl methacrylate was graft copolymerized in the resulting modified ethylenepropylene copolymer.

EXAMPLE 19

A propylene homopolymer [SUMITOMO NOBRENE D-501 (trademark) manufactured by Sumitomo Chemical Co., Ltd.], poly-(2,6-dimethylphenylene) ether (manufactured by Sumitomo Chemical Co., Ltd.), a hydrogenated styrene-isoprene block copolymer (hereinafter referred to as "hydrogenated SI") [KRATON G1701X (trademark) manufactured by Shell Chemical Co.], and the glycidyl methacrylate-grafted ethylene-propylene copolymer obtained in Reference Example 4 were mixed at a mixing ratio as shown in Table 7 by a super mixer. The resulting mix-

TABLE 6

|  |  | Example 15 | Example 16 | Example 17 | Example 18 |
|---|---|---|---|---|---|
| Resin composition |  |  |  |  |  |
| Polypropylene | Kind | Homopolymer | Random copolymer | Block copolymer | Homopolymer |
|  | Amount (part by weight) | 60 | 50 | 80 | 70 |
| Polyphenylene ether | Intrinsic viscosity (dl/g) | 0.40 | 0.40 | 0.45 | 0.40 |
|  | Amount (part by weight) | 40 | 50 | 20 | 30 |
| Hydrogenated SI | Amount (part by weight) | 3 | 5 | 10 | 5 |
| Modified ethylene-a-olefin copolymer | Kind | S-EP | S-EPD | S-EB | S-EB |
|  | Amount (part by weight) | 15 | 10 | 10 | 15 |
| Properties of composition |  |  |  |  |  |
| Flexural modulus (23° C., Kg/cm$^2$) |  | 11,600 | 12,100 | 10,400 | 11,300 |
| Heat distortion temperature (4.6 Kg load, °C.) |  | 147 | 140 | 134 | 146 |
| Izod impact strength (Kg · cm/cm) | 23° C. | 47 | 39 | 41 | 48 |
|  | −30° C. | 14 | 13 | 12 | 15 |

REFERENCE EXAMPLE 4

Preparation of glycidyl methacrylategraft modified ethylene-propylene copolymer:

100 Parts by weight of ethylene-propylene copolymer [ESPRENE E-120 (trademark) manufactured by Sumitomo Chemical Co., Ltd.], 5 parts by weight of glycidyl methacrylate and 0.1 part by weight of dicumyl peroxide were well mixed by a super mixer and the mixture was melt kneaded at 230° C by a twin-screw extruder [TEM-50 (trademark) manufactured by Toshiba Machine Co., Ltd.). It was found that 2.1% by ture was melt kneaded by a twin-screw extruder [TEM-50 manufactured by Toshiba Machine Co., Ltd.]at 260°–280° C. to obtain pellets. Measurement of properties was carried out and the results are shown in Table 7.

As can be seen from comparison of the results of Example 19 with those of Comparative Examples 1-3, the composition of the present invention where hydrogenated styrene-isoprene block copolymer and glycidyl methacrylate-modified ethylene-propylene copolymer were combined had peculiarly excellent properties.

TABLE 7

|  |  | Example 19 | Comparative Example 1 | Comparative Example 2 | Comparative Example 3 |
|---|---|---|---|---|---|
| Resin composition |  |  |  |  |  |
| Polypropylene | Kind | Homopolymer | Homopolymer | Homopolymer | Homopolymer |
|  | MFR (g/10 min) | 0.4 | 0.4 | 0.4 | 0.4 |
|  | Amount (part by weight) | 75 | 75 | 75 | 75 |
| Polyphenylene ether | Intrinsic viscosity (dl/g) | 0.35 | 0.35 | 0.35 | 0.35 |
|  | Amount (part by weight) | 25 | 25 | 25 | 25 |
| Hydrogenated styreneconjugated diene block copolymer | Kind | Hydrogenated SI | Hydrogenated SB | Hydrogenated SI | Hydrogenated SI |
|  | Amount (part by weight) | 5 | 5 | 5 | 15 |
| Glycidyl methacrylate grafted ethylene-propylene copolymer | Amount (part by weight) | 10 | 10 | — | — |
| Ethylene- | Amount (part by | — | — | 10 | — |

TABLE 7-continued

|  | Example 19 | Comparative Example 1 | Comparative Example 2 | Comparative Example 3 |
|---|---|---|---|---|
| propylene copolymer (weight) | | | | |
| Properties of composition | | | | |
| Flexural modulus (23° C., Kg/cm²) | 10,300 | 7,700 | 10,300 | 8,700 |
| Heat distortion temperature (4.6 Kg load, °C.) | 141 | 122 | 131 | 123 |
| Izod impact strength 23° C. (Kg · cm/cm) −30° C. | 42 12 | 23 6 | 12 5 | 29 7 |
| Surface appearance of molded articles | Good | Whitened | Whitened | Good |

EXAMPLES 20-24

Pellets were prepared in the same manner as in Example 19 at a mixing ratio of the components as shown in Table 8 and properties were evaluated. The results are shown in Table 8. Components used in Table 8 are as follows:

M-EP: Monoglycidyl maleate-modified ethylene-propylene copolymer [ethylene/propylene=about 8/2 (molar ratio), monoglycidyl maleate 2.3% by weight]

GMA-EB: Glycidyl methacrylate-modified ethylene-butene copolymer [ethylene/butene=about 8/2 (weight ratio) and glycidyl methacrylate 1.3% by weight]

TABLE 8

|  |  | Example 20 | Example 21 | Example 22 | Example 23 | Example 24 |
|---|---|---|---|---|---|---|
| Resin composition | | | | | | |
| Polypropylene | Kind | Homopolymer | Random copolymer | Block copolymer | Block copolymer | Homopolymer |
|  | Amount (part by weight) | 60 | 85 | 50 | 65 | 60 |
| Polyphenylene ether | Intrinsic viscosity (dl/g) | 0.40 | 0.45 | 0.40 | 0.40 | 0.35 |
|  | Amount (part by weight) | 40 | 15 | 50 | 35 | 40 |
| Hydrogenated SI | Amount (part by weight) | 10 | 7 | 12 | 8 | 5 |
| Modified ethylene-α-olefin copolymer | Kind | GMA-EP (1) | GMA-EP (2) | M-EP | GMA-EP (1) | GMA-EB |
|  | Amount (part by weight) | 10 | 3 | 10 | 12 | 10 |
| Properties of composition | | | | | | |
| Flexural modulus (23° C., Kg/cm²) | | 9,900 | 9,000 | 11,000 | 10,100 | 12,600 |
| Heat distortion temperature (4.6 Kg load, °C.) | | 135 | 131 | 143 | 138 | 144 |
| Izod impact strength (Kg · cm/cm) | 23° C. | 46 | 39 | 42 | 38 | 41 |
|  | −30° C. | 13 | 10 | 13 | 12 | 10 |

Polypropylene:

Homopolymer: SUMITOMO NOBRENE D-501 (trademark) manufactured by Sumitomo Chemical Co., Ltd.

Random copolymer: Propylene-ethylene random copolymer [SUMITOMO NOBRENE S-131 (trademark) manufactured by Sumitomo Chemical Co., Ltd.]

Block copolymer: Propylene-ethylene block copolymer [SUMITOMO NOBRE AS-171A (trademark) manufactured by Sumitomo Chemical Co., Ltd.]

Polyphenylene ether: Poly-(2,6-dimethylphenylene) ether (manufactured by Sumitomo Chemical Co., Ltd.)

Hydrogenated SI: KRAFTON G-1701X (trademark) manufactured by Shell Chemical Co.

Modified ethylene-α-olefin copolymer:

GMA-EP(1): Glycidyl methacrylate-modified ethylene-propylene copolymer (obtained in Reference Example 4)

GMA-EP(2): Glycidyl methacrylate-modified ethylene-propylene-ethylidene norbornane copolymer (prepared as in Reference Example 4 except that ESPRENE E-501A was used in place of ESPRENE E-120)

EXAMPLE 25

A propylene homopolymer [SUMITOMO NOBRENE D-501 (trademark) manufactured by Sumitomo Chemical Co., Ltd.], poly-(2,6-dimethylphenylene) ether (manufactured by Sumitomo Chemical Co., Ltd.), a hydrogenated styreneisoprene block copolymer (hereinafter referred to as "hydrogenated SI") [KRATON G1701X (trademark) manufactured by Shell Chemical Co.), and ethylene-methyl acrylate-glycidyl methacrylate copolymer (methyl acrylate: about 50% by weight, glycidyl methacrylate: about 2% by weight) were mixed at a mixing ratio as shown in Table 9 by a super mixer. The resulting mixture was melt kneaded by a twin-screw extruder [TEM-50 manufactured by Toshiba Machine Co., Ltd.) at 260°-280° C. to obtain pellets. Measurement of properties was carried out and the results are shown in Table 9.

As can be seen from comparison of the results of Example 25 with those of Comparative Examples 1-3, the composition of the present invention where hydrogenated styrene-isoprene block copolymer and ethylene-methyl methacrylate-glycidyl methacrylate copolymer were combined had peculiarly excellent properties.

TABLE 9

|  |  | Example 25 | Comparative Example 1 | Comparative Example 2 | Comparative Example 3 |
|---|---|---|---|---|---|
| Resin composition |  |  |  |  |  |
| Polypropylene | Kind | Homopolymer | Homopolymer | Homopolymer | Homopolymer |
|  | MFR (g/10 min) | 0.4 | 0.4 | 0.4 | 0.4 |
|  | Amount (part by weight) | 75 | 75 | 75 | 75 |
| Polyphenylene ether | Intrinsic viscosity (dl/g) | 0.35 | 0.35 | 0.35 | 0.35 |
|  | Amount (part by weight) | 25 | 25 | 25 | 25 |
| Hydrogenated styrene-conjugated diene block copolymer | Kind | Hydrogenated SI | Hydrogenated SB | Hydrogenated SI | Hydrogenated SI |
|  | Amount (part by weight) | 5 | 5 | 5 | 15 |
| Ethylene-methyl acrylate-glycidyl methacrylate copolymer | Amount (part by weight) | 10 | 10 | — | — |
| Ethylene-propylene copolymer | Amount (part by weight) | — | — | 10 | — |
| Properties of composition |  |  |  |  |  |
| Flexural modulus (23° C., Kg/cm$^2$) |  | 10,700 | 7,700 | 10,300 | 8,700 |
| Heat distortion temperature (4.6 Kg load, °C.) |  | 146 | 122 | 131 | 123 |
| Izod impact strength (Kg · cm/cm) | 23° C. | 44 | 23 | 12 | 29 |
|  | −30° C. | 12 | 6 | 5 | 7 |
| Surface appearance of molded articles |  | Good | Whitened | Whitened | Good |

EXAMPLES 26–29

Pellets were prepared in the same manner as in Example 25 at a mixing ratio of the components as shown in Table 10 and properties were evaluated. The results are shown in Table 10. Components used in Table 10 are as follows:

Polypropylene:
Homopolymer: SUMITOMO NOBRENE D-501 (trademark) manufactured by Sumitomo Chemical Co., Ltd.
Random copolymer: Propylene-ethylene random copolymer [SUMITOMO NOBRENE S-131 (trademark) manufactured by Sumitomo Chemical Co., Ltd.]
Block copolymer: Propylene-ethylene block copolymer [SUMITOMO NOBRENE AS-171A (trademark) manufactured by Sumitomo Chemical Co., Ltd.]
Polyphenylene ether: Poly-(2,6-dimethylphenylene) ether (manufactured by Sumitomo Chemical Co., ltd.)
Hydrogenated SI: KRATON G-1701X (trademark) manufactured by Shell Chemical Co.
α-Olefin-alkyl (meth)acrylate copolymer:
EMA-GMA: Ethylene-methyl acrylate-glycidyl methacrylate copolymer (same as used in Example 25)
E-EA: Ethylene-ethyl acrylate copolymer (ethyl acrylate: 18% by weight)
E-EA-MAH: Ethylene-ethyl acrylate-maleic anhydride copolymer (ethyl acrylate: 20% by weight, maleic anhydride: 2% by weight)

TABLE 10

|  |  | Example 26 | Example 27 | Example 28 | Example 29 |
|---|---|---|---|---|---|
| Resin composition |  |  |  |  |  |
| Polypropylene | Kind | Homopolymer | Block copolymer | Random copolymer | Homopolymer |
|  | Amount (part by weight) | 60 | 50 | 80 | 70 |
| Polyphenylene ether | Intrinsic viscosity (dl/g) | 0.40 | 0.40 | 0.45 | 0.35 |
|  | Amount (part by weight) | 40 | 50 | 20 | 30 |
| Hydrogenated SI | Amount (part by weight) | 7 | 10 | 5 | 8 |
| Modified ethylene-α-olefin copolymer | Kind | E-EA | EMA-GMA | E-EA-MAH | E-EA-MAH |
|  | Amount (part by weight) | 8 | 5 | 5 | 10 |
| Properties of composition |  |  |  |  |  |
| Flexural modulus (23° C., Kg/cm$^2$) |  | 11,000 | 9,900 | 9,100 | 9,000 |
| Heat distortion temperature (4.6 Kg load, °C.) |  | 141 | 145 | 132 | 137 |
| Izod impact strength | 23° C. | 39 | 42 | 35 | 48 |
|  | −30° C. | 10 | 13 | 10 | 15 |

TABLE 10-continued

|  | Example 26 | Example 27 | Example 28 | Example 29 |
|---|---|---|---|---|
| (Kg · cm/cm) | | | | |

As explained above, the resin composition of the present invention has excellent balance in mechanical strengths and good solvent resistance and processability.

The resin composition of the present invention can be easily molded into shaped articles very excellent in balance of properties such as impact resistance, heat resistance and solvent resistance and superior in uniformity and smoothness of appearance by ordinary molding methods such as injection molding, extrusion molding and blow molding.

What is claimed is:

1. A resin composition which comprises:
   (a) a polyolefin resin in an amount of 20-95% by weight,
   (b) a polyphenylene ether resin in an amount of 80-51% by weight,
   (c) a partially hydrogenated alkenyl aromatic compound-isoprene block copolymer in an amount of 3-45 parts by weight based on a total of 100 parts by weight of the components (a) and (b), and
   (d) a modified ethylene-α-olefin copolymer elastomer or an α-olefin-alkyl (meth)acrylate copolymer in an amount of 3-45 parts by weight based on a total of 100 parts by weight of the components (a) and (b).

2. A resin composition according to claim 1, wherein the modified ethylene-α-olefin copolymer (d) is an ethylene-α-olefin copolymer modified with an unsaturated monocarboxylic acid or a derivative thereof, an unsaturated dicarboxylic acid or a derivative thereof, a styrene compound, or an unsaturated epoxy compound.

3. A resin composition according to claim 1, wherein the α-olefin-alkyl (meth)acrylate copolymer (d) is a copolymer of an α-olefin of 2-6 carbon atoms and an alkyl (meth)acrylate having an alkyl group of 1-8 carbon atom.

4. A resin composition according to claim 1, wherein the polyolefin resin (a) is a homopolymer of an α-olefin of 3 or more carbon atoms, copolymer of an α-olefin of 3 or more carbon atoms with other α-olefin, a mixture thereof, copolymer of an α-olefin of 3 or more carbon atoms with other unsaturated monomer or oxidized, halogenated or sulfonated product of the above polymer.

5. A resin composition according to claim 1, wherein the polyolefin resin (a) is a crystalline propylene homopolymer or copolymer.

6. A resin composition according to claim 5, wherein the crystalline propylene homopolymer or copolymer has a melt flow rate of 0.01-400 g/10 min.

7. A resin composition according to claim 1, wherein the polyphenylene ether resin (b) has recurring unit represented by the following formula:

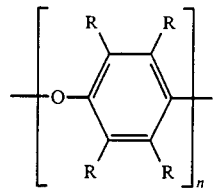

wherein ether oxygen atom links to benzene nucleus in the next adjacent unit, n is at least 30, a plurality of R each represents a hydrogen atom, a halogen atom, a hydrocarbon group containing no tertiary α-carbon atom, a halo-hydrocarbon group having at least two carbon atoms between halogen atom and phenyl nucleus, a hydrocarbon oxy group, or a halohydrocarbon oxy group having at least two carbon atoms between halogen atom and phenyl nucleus.

8. A resin composition according to claim 1, wherein the polyphenylene ether resin (b) has an intrinsic viscosity of 0.2-0.7 dl/g.

9. A resin composition according to claim 1, wherein the partially hydrogenated alkenyl aromatic compound-isoprene block copolymer (c) is an alkenyl aromatic compound-isoprene block copolymer which has a structure containing at least one chain block originating from the alkenyl aromatic compound and at least one chain block originating from the isoprene and in which content of aliphatic unsaturated group in the block originating from the isoprene is reduced by hydrogenation.

10. A resin composition according to claim 9, wherein the alkenyl aromatic compound has the chemical structure represented by the following formula:

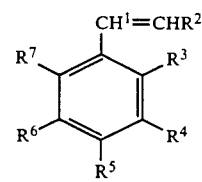

wherein $R^1$ and $R^2$ each represents hydrogen atom or a lower alkyl or alkenyl group of 1-6 carbon atoms, $R^3$ and $R^4$ each represents a hydrogen atom, a lower alkyl group of 1-6 carbon atoms, a chlorine atom or a bromine atom, and $R^5$, $R^6$ and $R^7$ each represents a hydrogen atom or a lower alkyl or alkenyl group of 1-6 carbon atoms and $R^6$ and $R^7$ may link together with a hydrocarbyl group to form a naphthyl group together with the benzene ring.

11. A resin composition according to claim 10 wherein the alkenyl aromatic compound is styrene.

12. A resin composition according to claim 9, wherein content of the block originating from the alkenyl aromatic compound in the block copolymer (c) is higher than 20% by weight and at most 80% by weight.

13. A resin composition according to claim 9, wherein content of unsaturated bond originating from aliphatic chain and remaining without hydrogenation in block copolymer (c) is 50% by weight or less.

14. A resin composition according to claim 1, wherein the block copolymer (c) has a number-average molecular weight of 5,000–500,000 g/mol.

15. A resin composition according to claim 1, wherein the ethylene-α-olefin copolymer of component (d) has an ethylene content of 30–93 mol %.

16. A resin composition according to claim 3, the ethylene-α-olefin copolymer of component (d) has an ethylene content of 30–93 mol %.

17. A resin composition according to claim 1, wherein the ethylene-α-olefin copolymer of component (d) has a melt flow rate of 0.1–50 g/10 min at 190° C.

18. A resin composition according to claim 1, wherein the ethylene-α-olefin copolymer of component (d) has a density of 0.90 g/cm or less.

19. A resin composition according to claim 1, wherein the α-olefin unit which constitutes the ethylene-α-olefin copolymer has 3–18 carbon atoms.

20. A resin composition according to claim 1, wherein the modification of the ethylene-α-olefin copolymer is carried out by grafting the unsaturated monocarboxylic acid or derivative thereof, the unsaturated dicarboxylic acid or derivative thereof, the styrene compound or the unsaturated epoxy compound on the copolymer.

21. A resin composition according to claim 20, wherein the graft ratio of the unsaturated monocarboxylic acid or derivative thereof, the unsaturated dicarboxylic acid or derivative thereof or the unsaturated epoxy compound is 0.05–10 parts by weight per 100 parts by weight of the ethylene-a-olefin copolymer.

22. A resin composition according to claim 20, wherein the graft ratio of the styrene compound is 0.3–50 parts by weight per 100 parts by weight of the ethylene-α-olefin copolymer.

23. A resin composition according to claim 2, wherein the unsaturated monocarboxylic acid or derivative thereof is acrylic acid, methacrylic acid or methyl methacrylate.

24. A resin composition according to claim 2, wherein the unsaturated dicarboxylic acid or derivative thereof is maleic anhydride, maleic acid, fumaric acid or nadic anhydride.

25. A resin composition according to claim 2, wherein the styrene compound is the alkenyl aromatic compound which constitutes the partially hydrogenated alkenyl aromatic compound-isoprene block copolymer.

26. A resin composition according to claim 2, wherein the unsaturated epoxy compound is a compound having both unsaturated bond and epoxy group in a molecule.

27. A resin composition according to claim 26, wherein the unsaturated epoxy compound is a glycidyl ester of an unsaturated carboxylic acid.

28. A resin composition according to claim 3, wherein the copolymer of α-olefin and alkyl (meth)acrylate (d) has an acrylate content or a methacrylate content of about 3–30% by weight.

29. A resin composition according to claim 3, wherein the copolymer of α-olefin and alkyl (meth)acrylate (d) has a functional group selected from the group consisting of carboxylic acid group, acid anhydride group, acid amide group, imide group, hydroxyl group and epoxy group.

* * * * *